(12) United States Patent
Isayama et al.

(10) Patent No.: US 11,036,053 B2
(45) Date of Patent: Jun. 15, 2021

(54) PROGRAM, INFORMATION PROCESSING METHOD, INFORMATION PROCESSING SYSTEM, HEAD-MOUNTED DISPLAY DEVICE, AND INFORMATION PROCESSING DEVICE

(71) Applicant: CYGAMES, INC., Tokyo (JP)

(72) Inventors: Hideyo Isayama, Tokyo (JP); Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 16/832,122

(22) Filed: Mar. 27, 2020

(65) Prior Publication Data
US 2020/0225490 A1    Jul. 16, 2020

Related U.S. Application Data

(63) Continuation of application No. PCT/JP2018/035948, filed on Sep. 27, 2018.

(30) Foreign Application Priority Data

Sep. 27, 2017 (JP) .............................. JP2017-186097

(51) Int. Cl.
*G02B 27/01* (2006.01)
*G06F 3/01* (2006.01)
(Continued)

(52) U.S. Cl.
CPC ..... *G02B 27/0172* (2013.01); *G02B 27/0101* (2013.01); *G06F 3/011* (2013.01);
(Continued)

(58) Field of Classification Search
USPC .......................................................... 345/8
See application file for complete search history.

(56) References Cited

U.S. PATENT DOCUMENTS

2004/0119744 A1* 6/2004 Chan ................... G06F 3/04812
715/763
2009/0244064 A1* 10/2009 Inokuchi .................. G09B 5/02
345/420

(Continued)

FOREIGN PATENT DOCUMENTS

JP    2017-004357 A    1/2017
JP    2017-152010 A    8/2017

OTHER PUBLICATIONS

Office Action in counterpart Japanese Patent Application No. 2017-186097 dated Nov. 15, 2017 (5 pages).

(Continued)

*Primary Examiner* — Chineyere D Wills-Burns
(74) *Attorney, Agent, or Firm* — Osha Bergman Watanabe & Burton LLP

(57) ABSTRACT

The present invention is a program executed by a processing device that performs rendering processing of a virtual space including a predetermined GUI object to be displayed on a display unit of a head-mounted display device, the program causing the processing device to execute a step of determining the position of a viewpoint of a user in the virtual space; a step of determining a movable range of the user in the virtual space; a step of determining a position of the GUI object in a region of the virtual space outside the determined movable range; a step of determining, by using a perspective property profile, a size of the GUI object in the virtual space such that the GUI object at the determined position has a constant display size on the display unit; and a step of generating rendering data of the virtual space including the GUI object.

13 Claims, 8 Drawing Sheets

(51) Int. Cl.
  *G06F 3/0484* (2013.01)
  *G06F 3/0485* (2013.01)
  *G06T 15/00* (2011.01)
  *G06T 19/00* (2011.01)
  *G02B 27/00* (2006.01)
  *G06F 3/0346* (2013.01)
  *A63F 13/25* (2014.01)
  *A63F 13/30* (2014.01)
  *A63F 13/428* (2014.01)
  *A63F 13/55* (2014.01)

(52) U.S. Cl.
  CPC ...... *G06F 3/04842* (2013.01); *G06F 3/04855* (2013.01); *G06T 15/00* (2013.01); *G06T 19/006* (2013.01); *G02B 2027/0123* (2013.01); *G02B 2027/0187* (2013.01)

(56) References Cited

U.S. PATENT DOCUMENTS

| | | | | |
|---|---|---|---|---|
| 2011/0285704 | A1* | 11/2011 | Takeda | A63F 13/26 345/419 |
| 2014/0361956 | A1* | 12/2014 | Mikhailov | G09G 3/3413 345/8 |
| 2014/0364215 | A1 | 12/2014 | Mikhailov et al. | |
| 2015/0094142 | A1* | 4/2015 | Stafford | G06F 3/017 463/31 |
| 2015/0254905 | A1* | 9/2015 | Ramsby | G02B 30/34 345/419 |
| 2016/0129346 | A1 | 5/2016 | Mikhailov et al. | |
| 2016/0364916 | A1* | 12/2016 | Terahata | G06F 3/0346 |
| 2017/0061936 | A1* | 3/2017 | Matsuyama | G09G 5/377 |
| 2017/0084051 | A1* | 3/2017 | Weising | G06F 3/012 |
| 2018/0046263 | A1* | 2/2018 | Shigeta | G06F 3/017 |
| 2018/0093186 | A1* | 4/2018 | Black | G06T 11/60 |
| 2019/0018479 | A1* | 1/2019 | Minami | G06F 3/017 |
| 2019/0033989 | A1* | 1/2019 | Wang | G06F 3/0346 |

OTHER PUBLICATIONS

Written Opinion for corresponding International Application No. PCT/JP2018/035948, dated Nov. 13, 2018 (4 pages).

International Search Report for corresponding International Application No. PCT/JP2018/035948, dated Nov. 13, 2018 (5 pages).

* cited by examiner

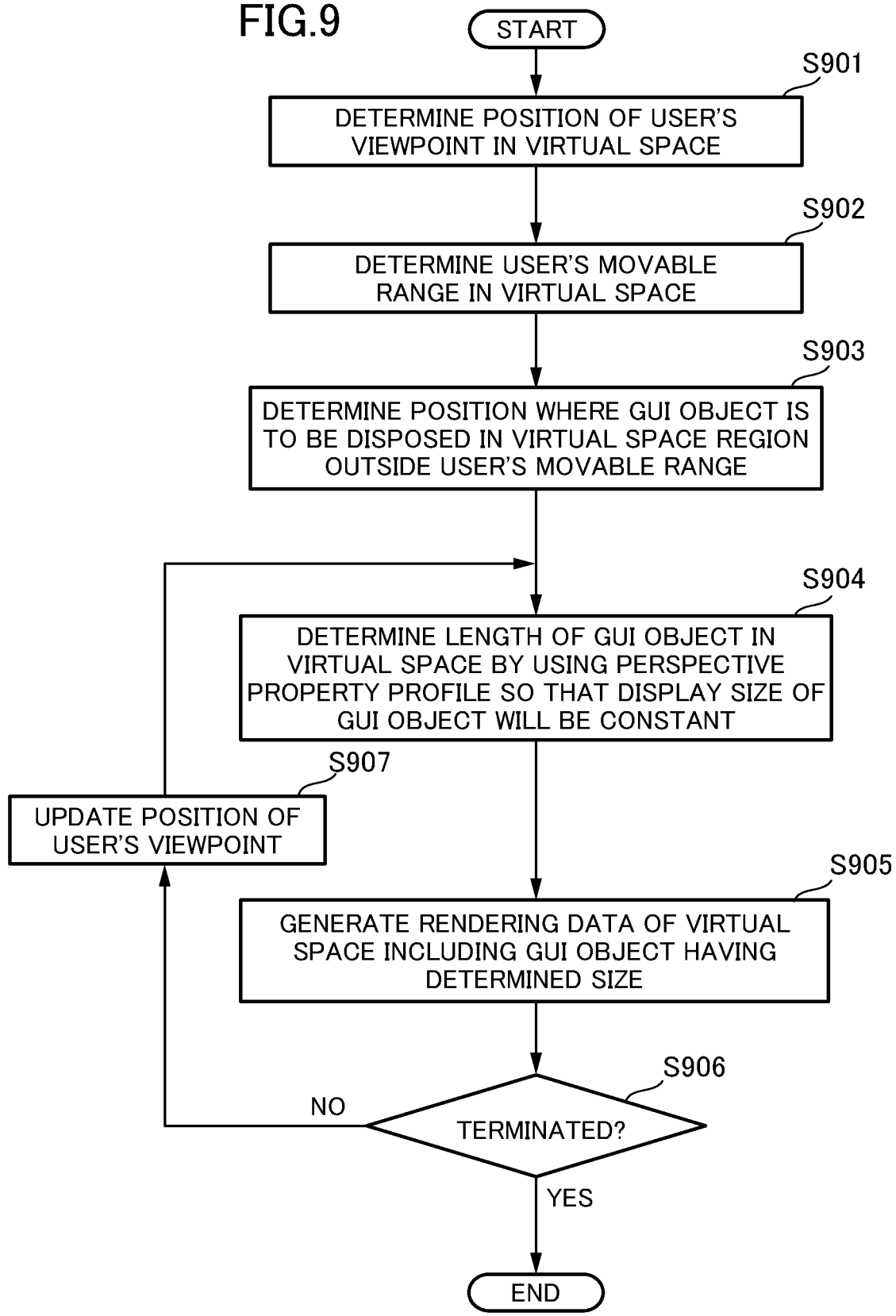

PROGRAM, INFORMATION PROCESSING METHOD, INFORMATION PROCESSING SYSTEM, HEAD-MOUNTED DISPLAY DEVICE, AND INFORMATION PROCESSING DEVICE

TECHNICAL FIELD

The present invention relates to programs, etc., specifically to programs, etc. for display on a display unit of a head-mounted display device.

BACKGROUND ART

Head-mounted displays (HMDs), which are worn on the head of a user and which display an image (video) on a display unit disposed in front of the eyes, such as a display, are known. An HMD makes it possible to provide a user wearing the HMD with a virtual reality (VR) world by providing the user with images and audio in a virtual space.

Recently, applications such as games that are played by a user while viewing a screen displayed on an HMD have also been developed. Such an application displays a background and a character image for letting the user experience the virtual space, as well as images of GUI elements (GUI objects) such as selection message windows. For example, Patent Literature 1 discloses an input method in which input is performed by using a GUI disposed in a virtual space.

CITATION LIST

Patent Literature

{PTL 1}
Japanese Unexamined Patent Application, Publication No. 2017-004357

SUMMARY OF INVENTION

Technical Problem

In the case where a GUI object is disposed in a virtual space in a VR application that displays images of virtual objects corresponding to arms, hands, etc. of a user himself or herself on a display unit of an HMD, there is the following problem. In such a VR application, the GUI object disposed in the virtual space must be disposed at a position relatively close to the user so that the user can recognize the GUI object. However, in the case where the GUI object interferes with the virtual objects corresponding to the arms, hands, etc. of the user himself or herself, the virtual reality space (virtual space) provided by the VR application causes the user to intuitively feel a considerable sense of unnaturalness. Specifically, the user experiencing the VR world perceives the VR world as if the arms, hands, etc. of the user penetrate or are buried in the GUI object, which considerably compromises the sense of immersion.

Meanwhile, although there is a method in which a GUI object is displayed in a portion of a display unit as if it were completely separated from a virtual space, it also considerably compromises the sense of immersion to display the GUI object as if it were completely separated from the virtual space.

The present invention has been made in order to solve the problem described above, and it is a chief object thereof to provide a program, etc. that makes it possible to suitably display a GUI object to a user in a virtual reality space.

Solution to Problem

In order to achieve the object described above, a program according to an aspect of the present invention is a program executed by a processing device that performs rendering processing of a virtual space including a predetermined GUI object to be displayed on a display unit of a head-mounted display device, the program being characterized by causing the processing device to execute a step of determining the position of a viewpoint of a user in the virtual space on the basis of a position of the head-mounted display device in a real space, the position being obtained by using a sensor; a step of determining a movable range of the user in the virtual space; a step of determining a position of the GUI object in a region of the virtual space outside the determined movable range; a step of determining, by using corresponding relationships between depth and display sizes of a unit length in the virtual space on the display unit, a size of the GUI object in the virtual space such that the GUI object at the determined position has a constant display size on the display unit; and a step of generating rendering data of the virtual space including the GUI object having the determined size.

Furthermore, in the present invention, preferably, the processing device is included in the head-mounted display device.

Furthermore, in the present invention, preferably, the processing device is included in an information processing device connected to the head-mounted display device so as to be able to communicate therewith.

Furthermore, in the present invention, preferably, the rendering processing includes rendering processing for rendering the virtual object corresponding to the position of a controller held by the user in the real space on the basis of the position of the controller, and the movable range of the user includes a movable range of the virtual object corresponding to the position of the controller.

Furthermore, in the present invention, preferably, in the step of determining the position of the GUI object, the position of the GUI object is determined such that the GUI object having the constant display size as viewed from the position of the viewpoint of the user does not overlap the other virtual objects.

Furthermore, preferably, in the present invention, the GUI object includes at least one of a selection window, a timed window, a progress bar, and a scroll bar.

Furthermore, in order to achieve the object described above, an information processing method according to an aspect of the present invention is an information processing method for performing rendering processing of a virtual space including a predetermined GUI object to be displayed on a display unit of a head-mounted display device, the information processing method being characterized by including a step of determining the position of a viewpoint of a user in the virtual space on the basis of a position of the head-mounted display device in a real space, the position being obtained by using a sensor; a step of determining a movable range of the user in the virtual space; a step of determining a position of the GUI object in a region of the virtual space outside the determined movable range; a step of determining, by using corresponding relationships between depths and display sizes of a unit length in the virtual space on the display unit, a size of the GUI object in the virtual space such that the GUI object at the determined position has a constant display size on the display unit; and a step of rendering, on the display unit, the virtual space including the GUI object having the determined size.

Furthermore, in order to achieve the object described above, an information processing system according to an aspect of the present invention is an information processing system including a head-mounted display device including a display unit for displaying a virtual space to a user, the information processing system being characterized by including a sensor that obtains a position of the head-mounted display device in a real space; a processing unit that performs rendering processing of the virtual space including a predetermined GUI object to be displayed on the display unit; and a storage unit that stores data representing corresponding relationships between depths and display sizes of a unit length in the virtual space on the display unit, wherein the processing unit determines the position of a viewpoint of the user in the virtual space on the basis of the position obtained by the sensor; determines a movable range of the user in the virtual space; determines a position of the GUI object in a region of the virtual space outside the determined movable range; determines, by using the data stored by the storage unit, a size of the GUI object in the virtual space such that the GUI object at the determined position has a constant display size on the display unit; and renders, on the display unit, the virtual space including the GUI object having the determined size.

Furthermore, in the present invention, preferably, the information processing system includes a controller held by the user, the rendering processing includes rendering processing for rendering the virtual object corresponding to the position of the controller on the basis of the position of the controller in a real space, and the movable range of the user includes a movable range of the virtual object corresponding to the position of the controller.

Furthermore, preferably, in the present invention, the data stored by the storage unit is prepared in advance by measuring, for each depth, a display size of the unit length in the virtual space displayed on the display unit.

Furthermore, preferably, in the present invention, the information processing system includes an information processing device connected to the head-mounted display device so as to be able to communicate therewith, and the processing unit is realized by the head-mounted display device and the information processing device.

Furthermore, in order to achieve the object described above, a head-mounted display device according to an aspect of the present invention is a head-mounted display device including a display unit for displaying a virtual space to a user, the head-mounted display device being characterized by including a processing unit that performs rendering processing of the virtual space including a predetermined GUI object to be displayed on the display unit; and a storage unit that stores data representing corresponding relationships between depths and display sizes of a unit length in the virtual space on the display unit, wherein the processing unit determines the position of a viewpoint of the user in the virtual space on the basis of a position of the head-mounted display device in a real space, the position being obtained by using a sensor; determines a movable range of the user in the virtual space; determines a position of the GUI object in a region of the virtual space outside the determined movable range; determines, by using the data stored by the storage unit, a size of the GUI object in the virtual space such that the GUI object at the determined position has a constant display size on the display unit; and renders, on the display unit, the virtual space including the GUI object having the determined size.

Furthermore, in order to achieve the object described above, an information processing device according to an aspect of the present invention is an information processing device for performing rendering processing of a virtual space including a predetermined GUI object to be displayed on a display unit of a head-mounted display device, the information processing device being characterized by including a processing unit that performs rendering processing of the virtual space to be displayed on the display unit; and a storage unit that stores data representing corresponding relationships between depths and display sizes of a unit length in the virtual space on the display unit, wherein the processing unit determines the position of a viewpoint of the user in the virtual space on the basis of a position of the head-mounted display device in a real space, the position being obtained by using a sensor; determines a movable range of the user in the virtual space; determines a position of the GUI object in a region of the virtual space outside the determined movable range; determines, by using the data stored by the storage unit, a size of the GUI object in the virtual space such that the GUI object at the determined position has a constant display size on the display unit; and sends, to the head-mounted display device, data for rendering, on the display unit, the virtual space including the GUI object having the determined size.

Advantageous Effects of Invention

The present invention makes it possible to suitably display a GUI object to a user in a virtual reality space.

BRIEF DESCRIPTION OF DRAWINGS

FIG. 9 is a flowchart showing information processing by the information processing system according to the embodiment of the present invention.

DESCRIPTION OF EMBODIMENTS

An information processing system according to an embodiment of the present invention will be described below with reference to the drawings. A VR system (virtual reality space) that is provided to a user by the information processing system according to this embodiment displays an image of virtual hands corresponding to the hands of a user himself or herself on a display unit of an HMD in the case where the hands of the user himself or herself wearing the HMD fall within the visual field region of the user.

Figure 1:
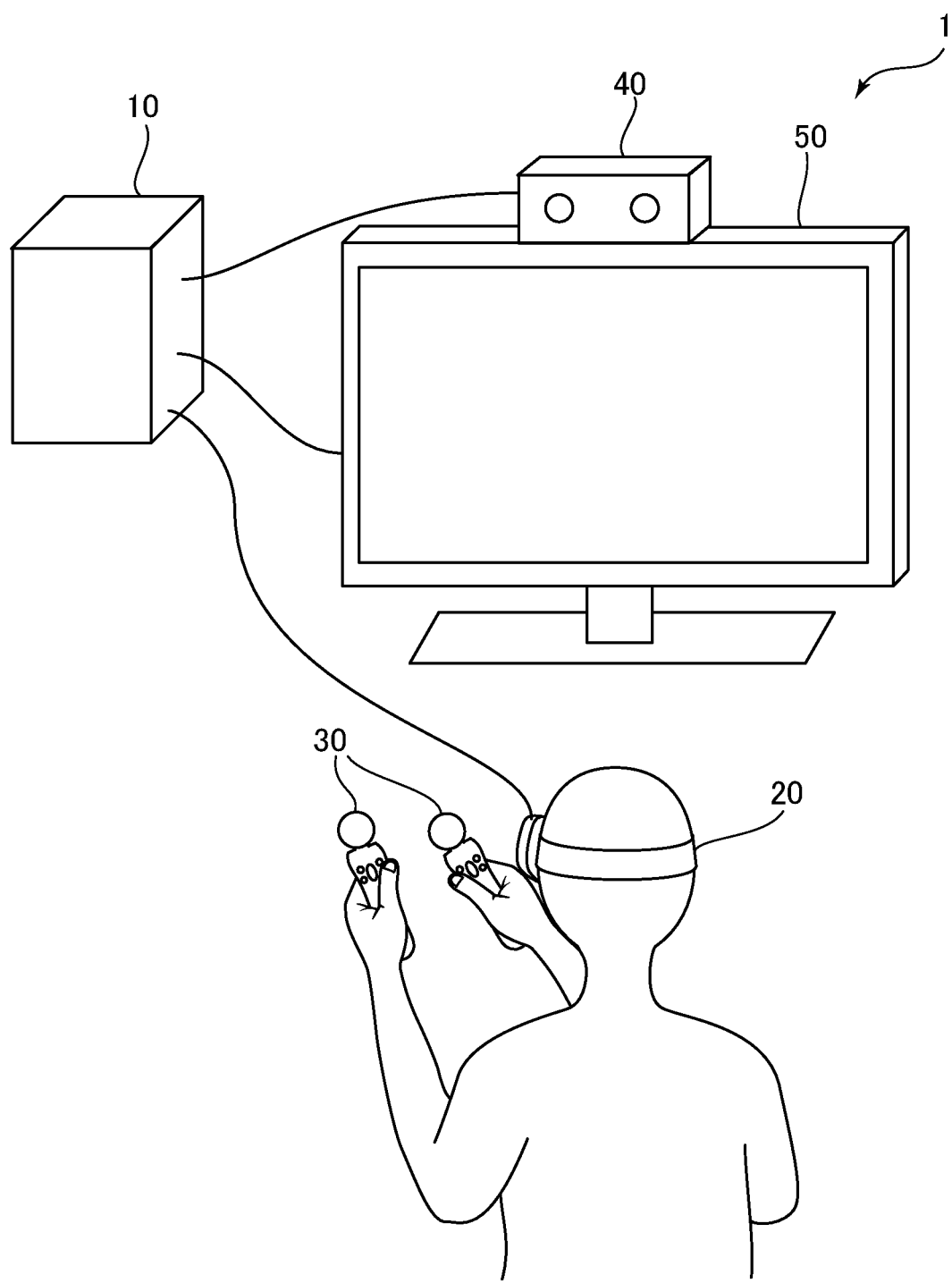
FIG. 1 is an overall configuration diagram of an information processing system according to an embodiment of the present invention.

FIG. 1 is an overall configuration diagram of an information processing system 1 according to an embodiment of the present invention. The information processing system 1 includes an information processing device 10, a head-mounted display device (HMD) 20 that is worn on the head of a user, controllers 30 that are held by the user, an image capturing device 40, and an output device 50. The information processing system 1 enables the user wearing the HMD 20 to experience virtual reality.

The image capturing device 40 includes a camera provided with an infrared sensor and sends images captured at a predetermined frame rate to the information processing device 10. Preferably, the image capturing device 40 is attached on top of the output device 50. As will be described later, in order to enable the user to experience virtual reality, the image capturing device 40 is configured to capture images of the HMD 20 worn by the user and to send the captured images to the information processing device 10. In one example, the image capturing device 40 captures images of infrared rays emitted by the HMD 20 worn by the user at the predetermined frame rate and sequentially sends the captured images to the information processing device 10, and the information processing device 10 sequentially obtains the images. In another example, instead of the infrared ray sensor or in addition to the infrared sensor, the camera of the image capturing device 40 is provided with an image sensor used in ordinary cameras, such as a CCD sensor or a CMOS sensor.

The information processing device 10 executes VR applications, which are various kinds of applications that provide a virtual reality space to the user wearing the HMD 20, such as a game. The information processing device 10 is electrically connected individually to the HMD 20, the controllers 30, the image capturing device 40, and the output device 50. The information processing device 10 may be connected to the individual devices by way of known wired communications using cables or the like or by way of known wireless communications such as wireless LANs. The VR application in this embodiment is a show-experiencing VR game that provides the user wearing the HMD 20 with an experience of enjoying a show of a pop idol or the like in a seat at the venues of the show. It is to be understood, however, that the VR application executed by the information processing device 10 is not limited thereto.

Figure 2:
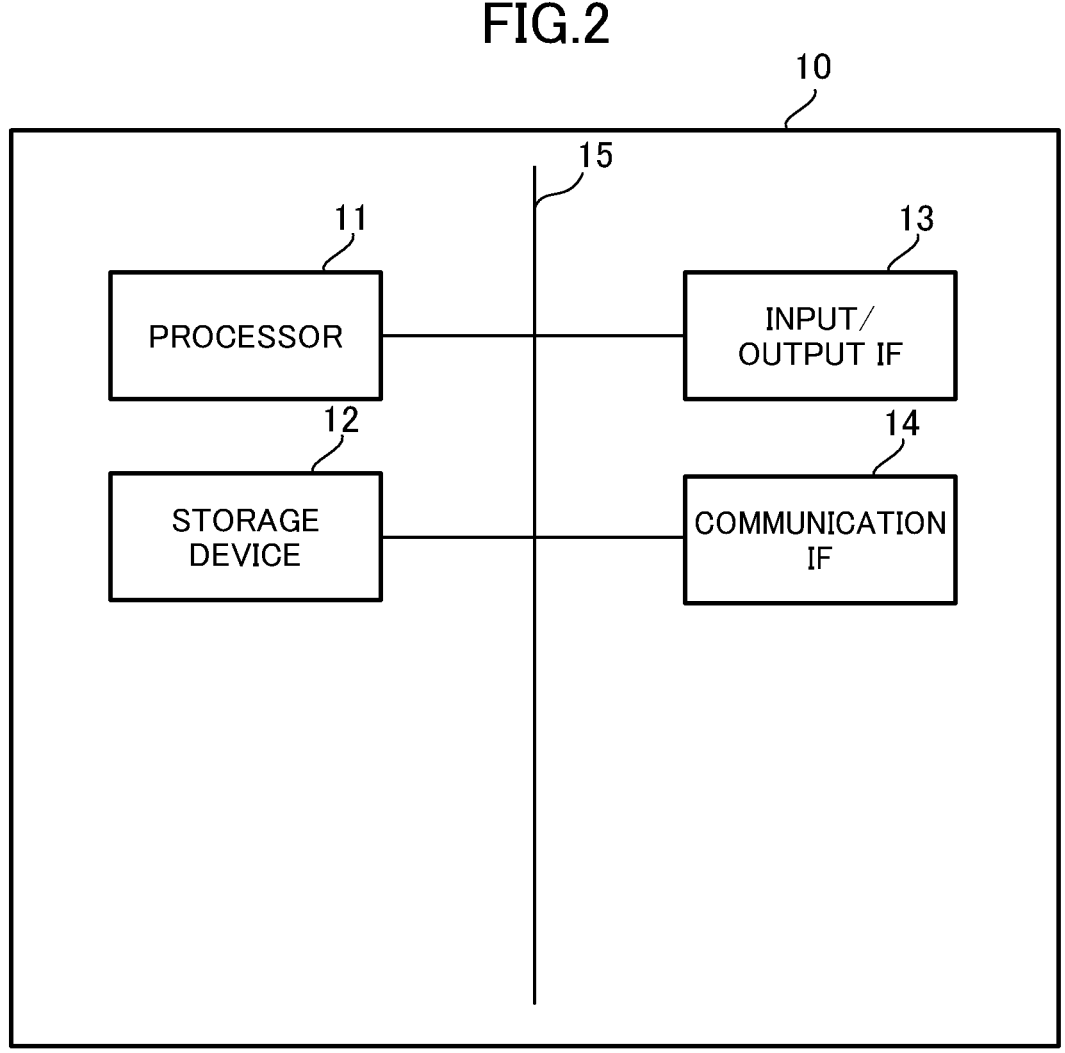
FIG. 2 is a block diagram showing the hardware configuration of an information processing device according to the embodiment of the present invention.

FIG. 2 is a block diagram showing the hardware configuration of the information processing device 10 according to the embodiment of the present invention. The information processing device 10 includes a processor 11, a storage device 12, an input/output interface (input/output IF) 13, and a communication interface (communication IF) 14. These constituent devices are connected via a bus 15. Note that interfaces are interposed between the bus 15 and the individual constituent devices as needed. Note that the information processing device 10 may be constituted of a plurality of electronic devices.

The processor 11 is a processing device that controls the overall operation of the information processing device 10, such as a CPU. Alternatively, an electronic circuit such as an MPU may be used as the processor 11. The processor 11 executes various kinds of processing by loading programs and data stored in the storage device 12 and executing the programs. Furthermore, the processor 11 includes a GPU that performs rendering processing, and the information processing device 10 generates a virtual space image to be presented to the user wearing the HMD 20 and sends the virtual space image to the HMD 20.

The input/output IF 13 is an interface for connecting input/output devices, such as the image capturing device 40, a display, a keyboard, and a mouse. The communication IF 14 is a communication interface for connecting to other computers or devices by way of wired communications or wireless communications. For example, the information processing device 10 is connected to the HMD 20 via the communication IF 14. Although these IFs are described as above for convenience of description, the kinds of interface for the individual devices are not limited to those described above, and different interfaces may be provided for the individual devices.

The storage device 12 includes a main storage device and an auxiliary storage device. The main storage device is a semiconductor memory, such as a RAM. A RAM is a volatile storage medium that allows high-speed reading and writing of information and is used as a storage area as well as a work area when the processor 11 processes information. The main storage device may include a ROM, which is a read-only non-volatile storage medium. In this case, the ROM stores programs such as firmware. The auxiliary storage device stores various programs and data that is used by the processor 11 when executing the individual programs. The auxiliary storage device is, for example, a hard disk device; however, the auxiliary storage device may be any type of non-volatile storage or non-volatile memory that is capable of storing information and also may be of the removable type. For example, the auxiliary storage device stores an operating system (OS), middleware, application programs, various kinds of data that may be referred to as these programs are executed, etc. The storage device 12 stores VR applications.

Figure 3:
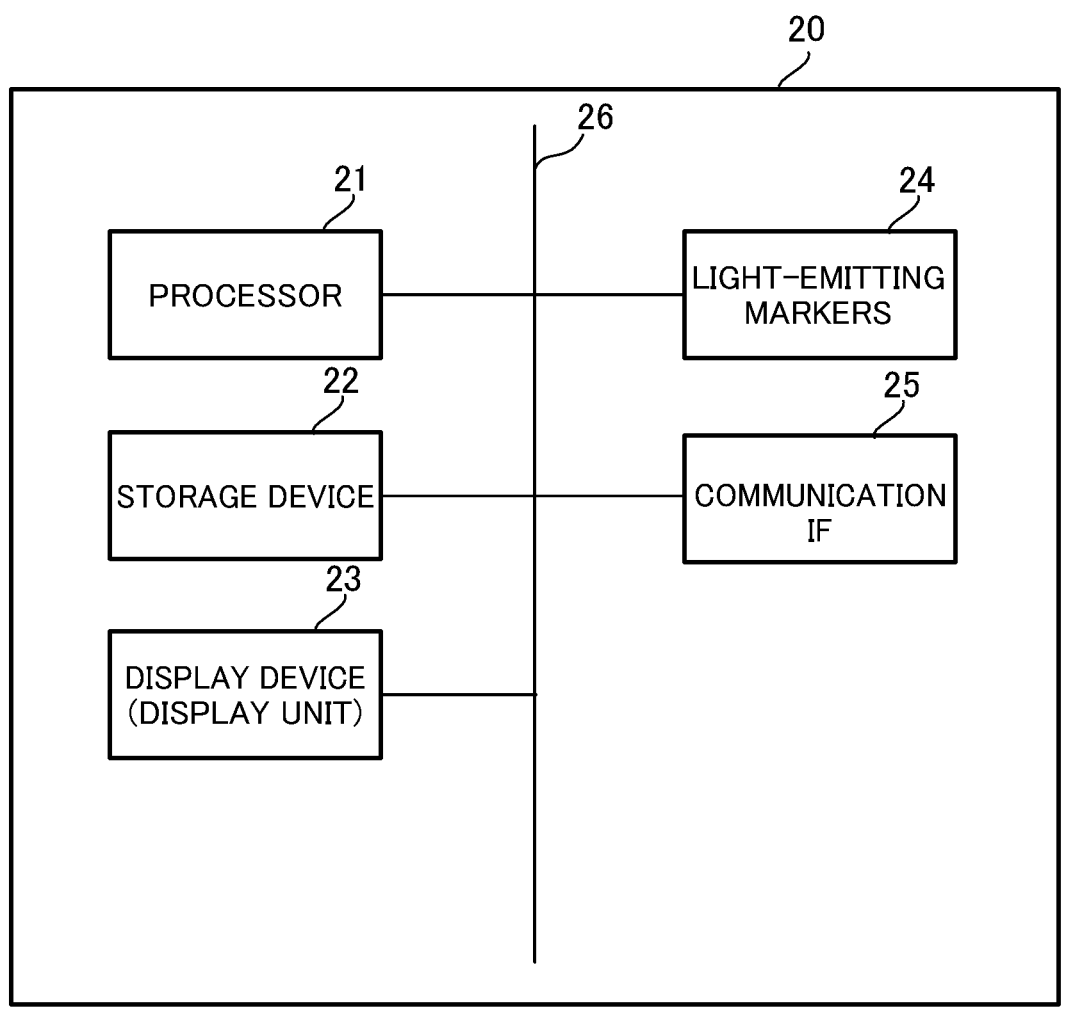
FIG. 3 is a block diagram showing the hardware configuration of an HMD according to the embodiment of the present invention.

FIG. 3 is a block diagram showing the hardware configuration of the HMD 20 according to the embodiment of the present invention. The HMD 20 includes a processor 21, a storage device 22, a display device (display unit) 23, LED lights 24, and a communication interface (communication IF) 25. These constituent devices are connected via a bus 26. Note that interfaces are interposed between the bus 26 and the individual constituent devices as needed.

The processor 21 is a processing device that controls the overall operation of the HMD 20, such as a CPU. Alternatively, an electronic circuit such as an MPU may be used as the processor 21. The processor 21 executes various kinds of processing by loading programs and data stored in the storage device 22 and executing the programs. The HMD 20 displays (renders) a virtual space image received from the information processing device 10 on the display device 23. Alternatively, the processor 21 may include a GPU that performs rendering processing. In this case, the HMD 20 can generate a virtual space image on behalf of the information processing device 10.

The storage device 22 includes a main storage device and an auxiliary storage device. The main storage device is a semiconductor memory, such as a RAM. A RAM is a volatile storage medium that allows high-speed reading and writing of information and is used as a storage area as well as a work area when the processor 21 processes information. The main storage device may include a ROM, which is a read-only non-volatile storage medium. In this case, the ROM stores programs such as firmware. The auxiliary storage device stores various programs and data that is used by the processor when executing the individual programs. The auxiliary storage device is, for example, a hard disk device; however, the auxiliary storage device may be any type of non-volatile storage or non-volatile memory that is capable of storing information and also may be of the removable type. For example, the auxiliary storage device stores an operating system (OS), middleware, application programs, various kinds of data that may be referred to as these programs are executed, etc.

The display device 23 is a non-transmissive display, such as a liquid crystal display or an organic EL display, and displays a virtual space image to the user wearing the HMD 20. Thus, for example, the HMD 20 may be an ordinary video see-through HMD. The display device 23 is a display device in the head-mounted display (HMD) and will hereinafter be referred to as a display unit 23 for convenience of description.

The LED lights 24 are configured of infrared LEDs, and a plurality of LED lights 24 are attached to the casing or the like of the HMD 20. The LED lights 24 are attached in order to realize tracking of the HMD 20, which moves as the head of the user moves. The LED lights 24 may be light-emitting elements that emit light having a predetermined color as long as it is possible to realize tracking of the HMD 20.

The communication IF 25 is a communication interface for connecting to other computers or devices by way of wired communications or wireless communications. For example, the HMD 20 is connected to the information processing device 10 via the communication IF 25.

In one modification, the HMD 20 is provided with posture sensors (not shown). In this case, the posture sensors include a gyro sensor and an acceleration sensor. The posture sensors detect sensor information including the position and rotation angle of the HMD 20, the direction in which the display unit 23 is facing, etc. and send the sensor information to the information processing device 10, and the information processing device 10 sequentially obtains the sensor information. In another modification, the HMD 20 is provided with a camera (not shown) configured of a CCD sensor, a CMOS sensor, or the like. In this case, the camera sequentially sends captured images to the information processing device 10, and the information processing device 10 sequentially obtains the images.

Figure 4:
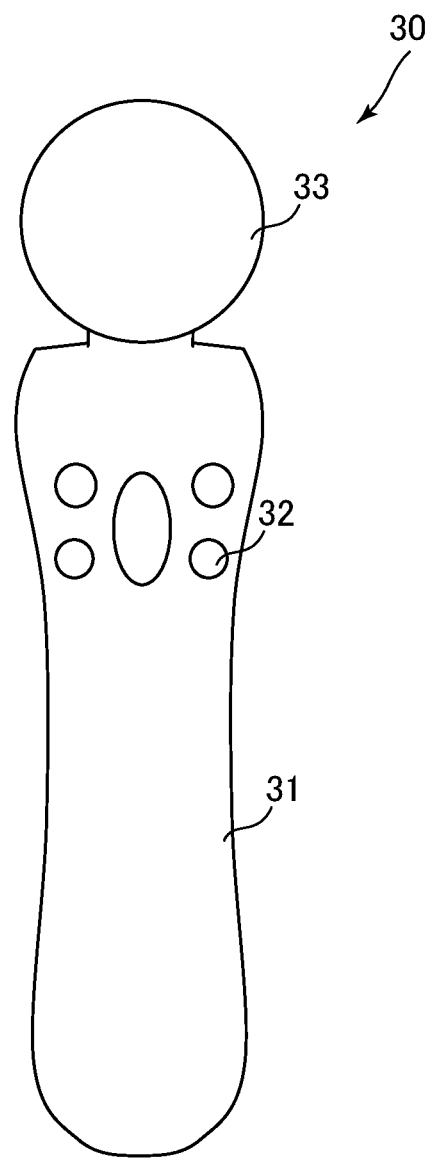
FIG. 4 is a schematic external view of a controller according to the embodiment of the present invention.

FIG. 4 is a schematic external view of the controller 30 according to the embodiment of the present invention. The controller 30 is a stick-type controller including a holding section 31, operation buttons 32, and an LED light 33. The holding section 31 is a portion that is held when the user operates the controller 30. The operation buttons 32 are one or more buttons that are provided on an ordinary game machine. The LED light 33 is configured of an LED that emits light having a predetermined color and is attached at an end of the controller.

In this embodiment, the controllers 30 include two controllers individually corresponding to two hands, and the user performs user operations by moving his or her arms or hands while holding the holding sections 31 or by operating the operation buttons 32. In one example, the information processing device 10 determines the position and movement of the controllers 30 by tracking the positions of the LED lights 33 in captured images obtained from the image capturing device 40. In one example, the controllers 30 send information about buttons pressed by the user to the information processing device 10.

The controllers 30 may be provided with motion sensors including gyro sensors and acceleration sensors. In this case, the controllers 30 send sensor information including the position, rotation angle, etc. of the controller 30 as detected by the motion sensors to the information processing device 10.

The output device 50 is an ordinary display that outputs images and audio. In one example, the output device 50 is a liquid crystal display, a display utilizing organic EL, or a plasma display. In one example, the output device 50 is configured to output the same image as the virtual space image that is presented to the user wearing the HMD 20. With this configuration, the image that is being viewed by the user via the HMD 20 can be checked by another user via the output device 50. In this case, however, the information processing system 1 need not include the output device 50. In another example, the output device 50 displays an administrator setting screen. With this configuration, an administrator can make settings concerning the information processing system 1 by entering commands from an input device such as a keyboard or a mouse. The output device 50 may also include an ordinary speaker that outputs audio.

Figure 5:
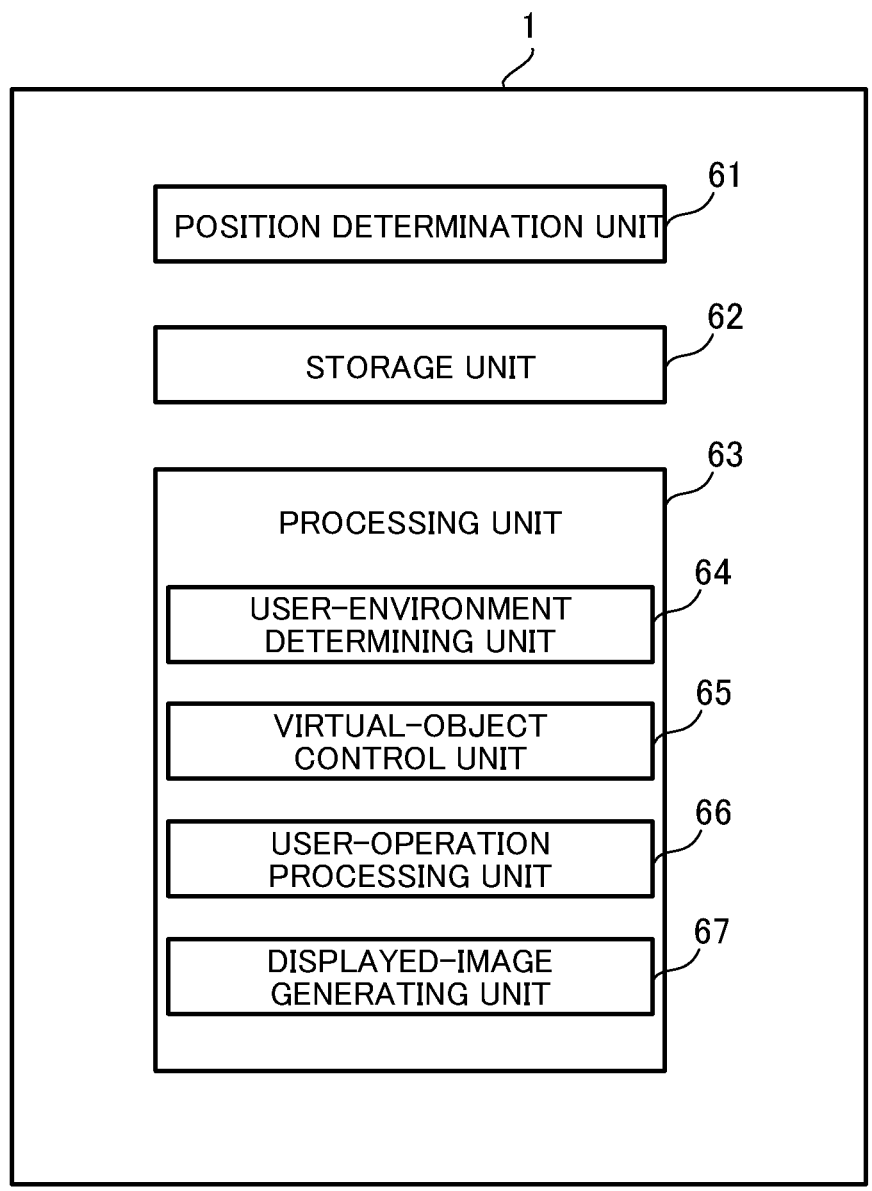
FIG. 5 is a functional block diagram of the information processing system according to the embodiment of the present invention.

FIG. 5 is a functional block diagram of the information processing system 1 according to the embodiment of the present invention. The information processing system 1 includes a position determination unit 61, a storage unit 62, and a processing unit 63. These functions are realized by the processor 11 of the information processing device 10 or the processor 21 of the HMD 20 executing programs. Thus, at least one of the information processing device 10 and the HMD 20 has the various functions shown in FIG. 5. Since the various functions are realized by loading programs, a portion of one part (function) may be included in another part. Note that, depending on the case, a portion or the entirety of each of the functions may be realized with hardware by configuring an electronic circuit or the like for realizing that function.

The position determination unit 61 determines the position of the HMD 20 from obtained sensor information by using the image capturing device 40 as a sensor for position determination. The position determining unit 61 determines the position and inclination of the HMD 20 by identifying the positions of the plurality of LED lights 24 attached to the HMD 20 from captured images of the HMD 20 worn by the user, sequentially obtained from the image capturing device 40.

In one example, the position of the HMD 20 that is determined by the position determination unit 61 is determined on the basis of the position thereof relative to the image capturing device 40. In one example, the position determination unit 61 further determines the direction in which the display unit 23 of the HMD 20 is facing by identifying the positions of the plurality of LED lights 24 attached to the HMD 20. With this configuration, it becomes possible for the information processing system 1 to recognize the position, inclination, movement, etc. of the head of the user, thereby determining the position of the user or the visual field region of the user.

In one example, the posture sensors included in the HMD 20 are used as sensors for position determination. In this case, the position determination unit 61 determines the position and inclination of the HMD 20 by further using sensor information detected by the posture sensors. With the configuration wherein the position and inclination of the HMD 20 are tracked by using a combination of the image capturing device 40 for identifying the positions of the LED lights 24 and the posture sensors for detecting the position, rotation angle, etc. of the HMD 20, as described above, it becomes possible for the position determination unit 61 to perform tracking processing with high accuracy. Note, however, that the tracking processing described above is an example, and other known techniques may also be used. In another example, the position determination unit 61 determines the position and inclination of the HMD 20 by using a combination of the image capturing device 40 for identifying the positions of the LED lights 24 and a sensor for irradiating a target object with reference light and measuring the reflected light.

In one modification, the position determination unit 61 determines the position and inclination of the HMD 20 from obtained sensor information by using only the camera included in the HMD 20 as a sensor for position determination. The position determination unit 61 determines the position and inclination of the HMD 20 by identifying the position thereof relative to an image-capturing target object from captured images of the image capturing device 40, etc., sequentially obtained from the HMD 20.

Furthermore, the position determination unit 61 determines the position of the controllers 30 from obtained sensor information by using the image capturing device 40 as a sensor for position determination. The position determination unit 61 determines the position and inclination of the controllers 30 by identifying the positions of the LED lights 33 attached to the controllers 30 from captured images of the controllers 30 held by the user, sequentially obtained from the image capturing device 40. In the case where the captured images include the LED lights 33 individually attached to the two controllers 30, the position determination unit 61 determines the individual positions and inclinations of the two controllers.

In one example, the motion sensors included in the controllers 30 are used as sensors for position determination. In this case, the position determination unit 61 determines the position and inclination of the controllers 30 by further using sensor information detected by the motion sensors. With the configuration wherein the position and inclination of the controllers 30 are tracked by using a combination of the image capturing device 40 for identifying the positions of the LED lights 33 and the motion sensors for detecting the position, rotation angle, etc. of the HMD 20, as described above, it becomes possible for the position determination unit 61 to perform tracking processing with high accuracy. Note, however, that the tracking processing described above is an example, and other known techniques may also be used.

The position determination unit 61 continues to determine the position of the HMD 20 or the controllers 30 by using sensor information sequentially obtained from the sensors for position determination. In one example, the position determination unit 61 continues to determine the position and inclination of the HMD 20 regularly at predetermined intervals in accordance with captured images sequentially obtained from the image capturing device 40. In another example, the position determination unit 61 continues to determine the position and inclination of the controllers 30 regularly at predetermined intervals in accordance with captured images sequentially obtained from the image capturing device 40.

The storage unit 62 stores programs, data, etc. in the storage device 12 or the storage device 22. The storage unit 62 stores information related to a virtual space and information related to virtual objects disposed in the virtual space.

The processing unit 63 executes various kinds of processing for executing a VR application, such as a game. The processing unit 63 includes a user-environment determining unit 64, a virtual-object control unit 65, a user-operation processing unit 66, and a displayed-image generating unit 67.

Initially, according to what is defined by the VR application, the user-environment determining unit 64 constructs a three-dimensional virtual space and determines an initial position of the user in the virtual space on the basis of the position of the HMD 20 in the real space as obtained by using the sensors for position determination. The initial position of the user is a user position in the initial state, such as the state upon the activation of the VR system. The user position includes a viewpoint position of the user, and the user-environment determining unit 64 sets a virtual camera at the viewpoint position of the user. Here, since the image as viewed from the virtual camera is an image that is viewed by the user, it will be understood that the region captured by the virtual camera, i.e., the visual field region of the virtual camera, corresponds to the visual field region of the user. The user-environment determining unit 64 determines the initial position of the user and the visual field region of the user by determining the position of the user and the direction in which the user is facing by using the position and inclination of the HMD 20 as determined by the position determination unit 61.

At this time, the user-environment determining unit 64 determines a movable range of the user, which is a range in which the user is allowed to move in the virtual space, by using the initial position of the user. For example, in the case where the VR application is a show-experiencing VR game, the user-environment determining unit 64 constructs a three-dimensional virtual space in the venue of the show, determines the seat position and visual field region of the user, and determines a movable range of the user in the venue of the show.

In one example, the position determination unit 61 determines the position of the HMD 20 on the basis of the position thereof relative to the image capturing device 40, and the user-environment determining unit 64 determines an initial position of the user in the virtual space in accordance with the thus-determined position of the HMD 20. In one example, the user-environment determining unit 64 determines a movable range of the user on the basis of a region in which the user can move in the real space. For example, the user-environment determining unit 64 sets a boundary in the depth direction of the movable range of the user at a position nearer than the position in the virtual space corresponding to the position of the image capturing device 40 existing in the real space. As described above, in this embodiment, the user-environment determining unit 64 determines a movable range of the user when the VR system is activated, such as when a virtual space is constructed, in accordance with the position of the HMD 20 in the real space and the environment of the virtual space constructed according to the content of the VR application.

Also, after determining the initial position, the user-environment determining unit 64 determines the visual field region of the virtual camera by determining the position of the user and the direction in which the user is facing from the position and inclination of the HMD 20 as determined by the position determination unit 61. Here, in this embodiment, the length in the virtual space constructed by the user-environment determining unit 64 is substantially the same as the length in the real space. When the user wearing the HMD 20 moves by 0.1 m in one direction in the real space, the user-environment determining unit 64 moves the virtual camera in the virtual space by 0.1 m in the direction corresponding to that direction in the virtual space. In one example, the user-environment determining unit 64 continues to determine the viewpoint position of the user and the visual field region of the virtual camera by using the position and inclination of the HMD 20 as determined by the position determination unit 61 regularly at predetermined intervals. Note, however, that the length in the virtual space constructed by the user-environment determining unit 64 need not be the same as the length in the real space as long as the length corresponds to the length in the real space.

The virtual-object control unit 65 disposes virtual objects of set sizes at set positions according to what is defined by the VR application. For example, in the case where the VR application is a show-experiencing VR game, the virtual-object control unit 65 disposes virtual objects corresponding to objects constituting the venue of the show, such as building walls, seats, and fences, as well as virtual objects corresponding to persons, such as a pop idol and other spectators. In the case where any virtual object is disposed in the visual field region of the virtual camera, the displayed-image generating unit 67, which will be described later, generates a virtual space image including the virtual object as viewed from the virtual camera.

In this object, the virtual objects include a predetermined GUI object, such as a selection window for allowing the user to perform selection operations by using the controllers 30 or a message window for alerting the user about settings. For convenience of description, this embodiment will be described in the context of a case where only one GUI object is disposed in the virtual space; however, a plurality of GUI objects may be disposed. In one example, the GUI object includes at least one of a selection window, a timed window, a progress bar, and a scroll bar.

Figure 6:
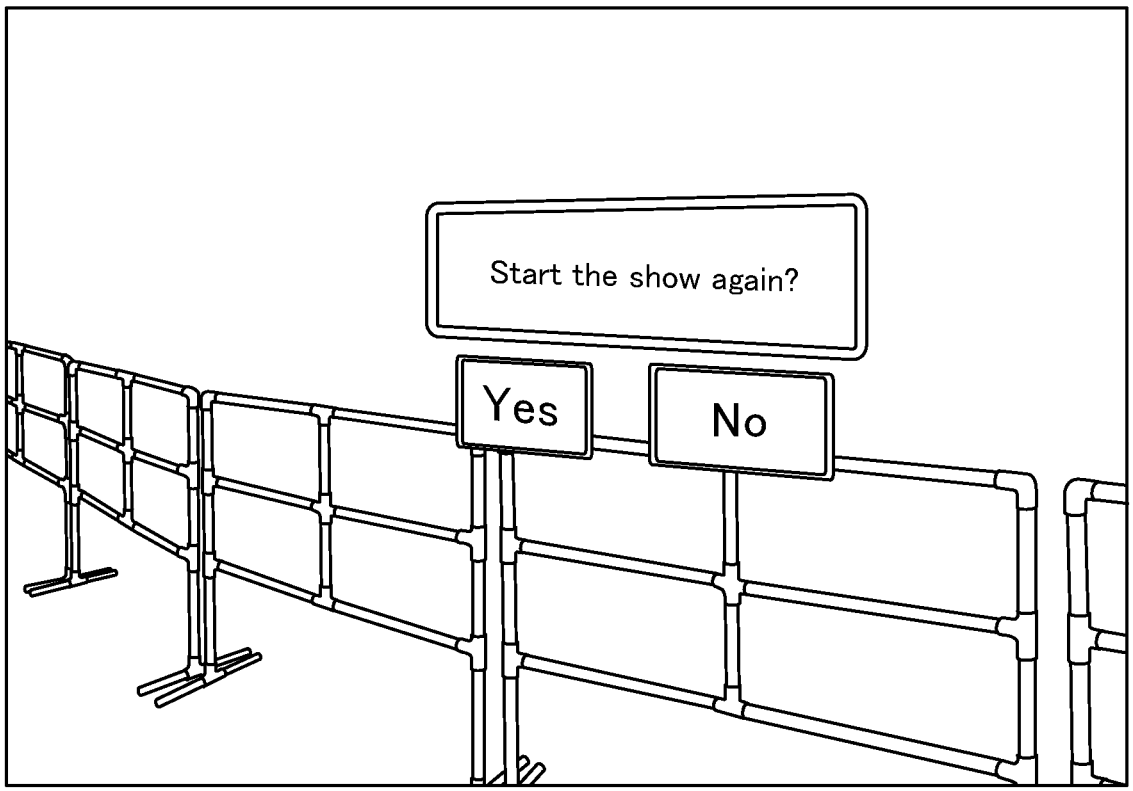
FIG. 6 is an illustration showing an example of a GUI object displayed on a display unit, according to the embodiment of the present invention.

FIG. 6 shows a virtual space image including an example of a GUI object according to the embodiment of the present invention, specifically, an example of a GUI object in a show-experiencing VR game, generated by the display-image generating unit 67. As shown in FIG. 6, the virtual-object control unit 65 disposes the GUI object at a predetermined position in the virtual space similarly to other virtual objects. This is because the sense of immersion perceived by the user experiencing the world of VR would be compromised if the processing unit 63 was configured to display the GUI object on the display unit 23 of the HMD 20 as if it were completely separated from the virtual world. Note, however, that the information processing system 1 disposes the GUI object in order to let the user recognize the GUI object in the virtual space, not in order to let the user touch the GUI object in the virtual space to perform a user operation.

The GUI object shown in FIG. 6 includes a query window asking the user "Start the show again?" as well as "Yes" and "No" windows for accepting a reply from the user. The user-operation processing unit 66, which will be described later, accepts a selection operation by the user using the controllers 30 to determine whether or not to start the show again. As described above, the GUI object in this embodiment is a virtual object that prompts the user to perform a selection operation by using the controllers 30, which must be recognized by the user.

The user-operation processing unit 66 disposes stick-shaped virtual penlights corresponding to the controllers 30 at positions in the virtual space corresponding to the positions of the controllers 30 in the real space by using the positions and inclinations of the two controllers 30 as determined by the position determination unit 61. At this time, the user-operation processing unit 66 estimates the positions of arms and hands holding the penlights from the positions and inclinations of the virtual penlights and also disposes virtual hands and virtual arms holding the virtual penlights. Thus, the user-operation processing unit 66 disposes a virtual body including the virtual penlights, the virtual hands, and the virtual arms at positions in the virtual space corresponding to the controllers 30, the user's hands, and the user's arms in the real space. Note, however, that the virtual body may be an object including at least one of the virtual penlights, the virtual hands, and the virtual arms. Furthermore, since the above-described function of the user-operation processing unit 66 is disposing virtual objects in accordance with user operations, the function may be executed in part or in entirety by the virtual-object control unit 65. Note that the stick-shaped virtual penlights are an example of stick-shaped virtual objects corresponding to the stick-shaped controllers 30, and the shape is not limited to this shape. Furthermore, in one example, the user-operation processing unit 66 continues to update the position of the virtual body by using the positions and inclinations of the controllers 30 as regularly determined at predetermined intervals by the position determination unit 61.

Furthermore, the user-operation processing unit 66 performs predetermined processing in the VR application in accordance with what is defined by the VR application and information about the operation buttons 32 pressed by the user. At this time, for example, the controllers 30 send operation information, which is information about the operation buttons 32 pressed by the user, to the information processing device 10, and the user-operation processing unit 66 performs predetermined processing by using the operation information received by the information processing device 10. As another example, in the case where the GUI object shown in FIG. 6 is displayed, the user-operation processing unit 66 can determine whether or not to start the show again according to the operation information received from the controllers 30.

The displayed-image generating unit 67 generates a virtual space image to be presented to the user, as viewed from the virtual camera, which is displayed on the display unit 23 of the HMD 20. The displayed-image generating unit 67 varies the display sizes of disposed virtual objects in accordance with the distances thereof from the virtual camera. For example, in the case where the displayed-image generating unit 67 generates images of virtual objects having the same size, the nearer virtual object is displayed as being larger, and the farther virtual object is displayed as being smaller. In one example, the displayed-image generating unit 67 is realized by implementing LOD in which the number of polygons is decreased in accordance with the distance from the virtual camera, which has hitherto been known.

In the case where any virtual object exists in the visual field region of the virtual camera, the displayed-image generating unit 67 generates a virtual space image including the virtual object existing in the visual field region. Similarly, in the case where the virtual body exists in the visual field region of the virtual camera, the displayed-image generating unit 67 generates a virtual space image including the virtual body existing in the visual field region.

Figure 7:
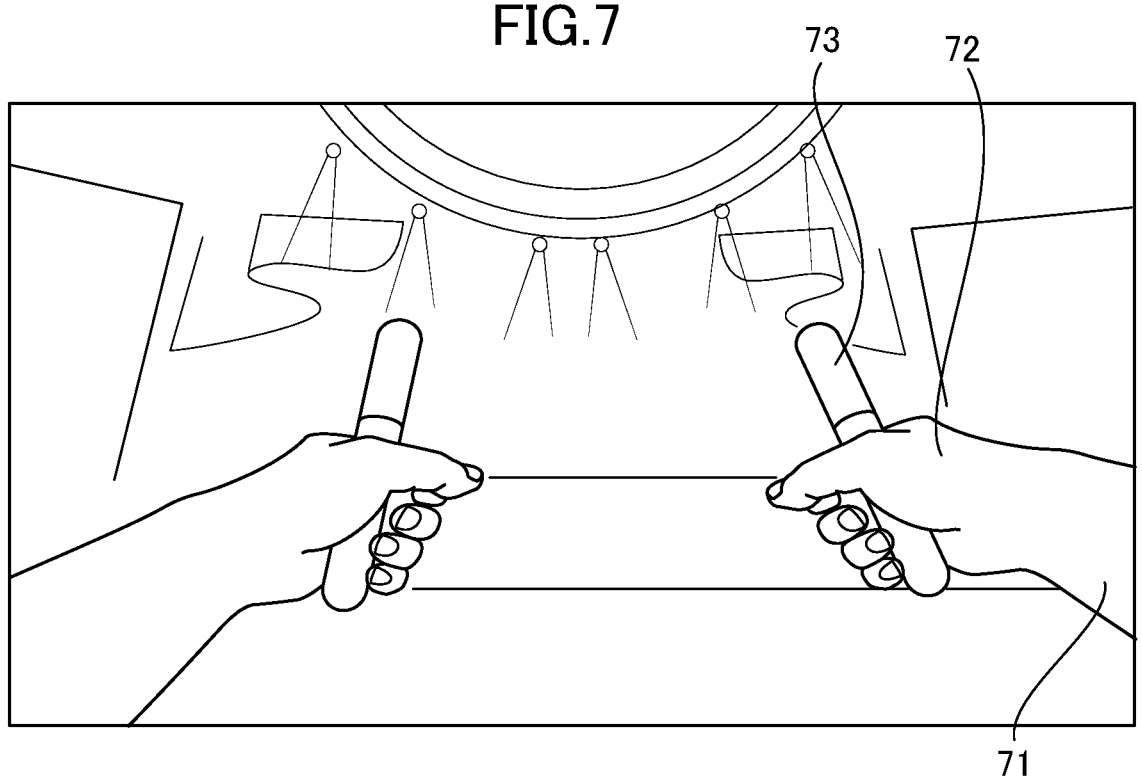
FIG. 7 is an illustration showing an example of a virtual body displayed on the display unit, according to the embodiment of the present invention.

FIG. 7 shows an example of a virtual body displayed by the display unit 23 according to the embodiment of the present invention, specifically, an example of a virtual body displayed by the display unit 23 in the show-experiencing VR game. As will be understood from the figure, in this embodiment, the displayed-image generating unit 67 generates a virtual space image including a virtual body including virtual penlights 71, virtual hands 72, and virtual arms 73 existing in the visual field region of the virtual camera. With this configuration, in this embodiment, it becomes possible for the information processing system 1 to let the user recognize the virtual body recognized by the user via the display unit 23 as if the hands and arms of the user himself or herself and the penlights held by the user himself or herself. This makes it possible to let the user experience a sense of immersion, which is an attraction of VR.

Here, the user's movable range determined by the user-environment determining unit 64 includes a movable range of the virtual objects corresponding to the controllers 30 in the real space. In this embodiment, the user's movable range determined by the user-environment determining unit 64 includes a region in the virtual space in which the virtual body including the virtual penlights, the virtual hands, and the virtual arms may be disposed.

In this embodiment, the virtual-object control unit 65 determines the position where the GUI object is to be disposed at a predetermined position having a greater depth than the user's movable range. With this configuration, in this embodiment, the information processing system 1 prevents interference between the virtual body and the GUI object. For example, this makes it possible to prevent an impression that the user's arms look as if they are penetrating or buried in the GUI object.

However, when the virtual-object control unit 65 disposes the GUI object at a position having a greater depth than the user's movable range, the display size of the GUI object in the virtual space image generated by the displayed-image generating unit 67 becomes small. That is, the display size of the GUI object displayed on the display unit 23 by the HMD 20 becomes small. The GUI object is a selection window for allowing the user to perform a selection operation by using the controllers 30, a message window for alerting the user, etc., which must be recognized by the user. Thus, it is not preferable that the display size becomes small.

In this embodiment, as will be described below, the virtual-object control unit 65 determines the size of the GUI object in the virtual space such that the display size of the GUI object on the display unit 23 at the determined position is constant. For example, the size in the virtual space is the vertical length and the horizontal length in the virtual space.

The storage unit 62 stores a perspective property profile, which is data indicating the corresponding relationship between depths representing distances from the virtual camera and display sizes of the unit length in the virtual space on the display unit 23. In this embodiment, the perspective property profile is generated before a VR application becomes available to general users, for example, during the development of the VR application. Since the perspective property profile generally varies depending on the VR application, it is necessary to generate a perspective property profile for each VR application. The perspective property profile is prepared in advance by displaying a unit length that serves as a basis for perspective on the display unit 23, varying the depth of the unit length, and measuring the relationship between the depth and the display size of the unit length on the display unit 23. The unit length indicates a length that serves as a basis in the virtual space; it is not limited to any specific length and may be any length that can represent the relationship between the depth and the display size of the unit length on the display unit 23.

Figure 8:
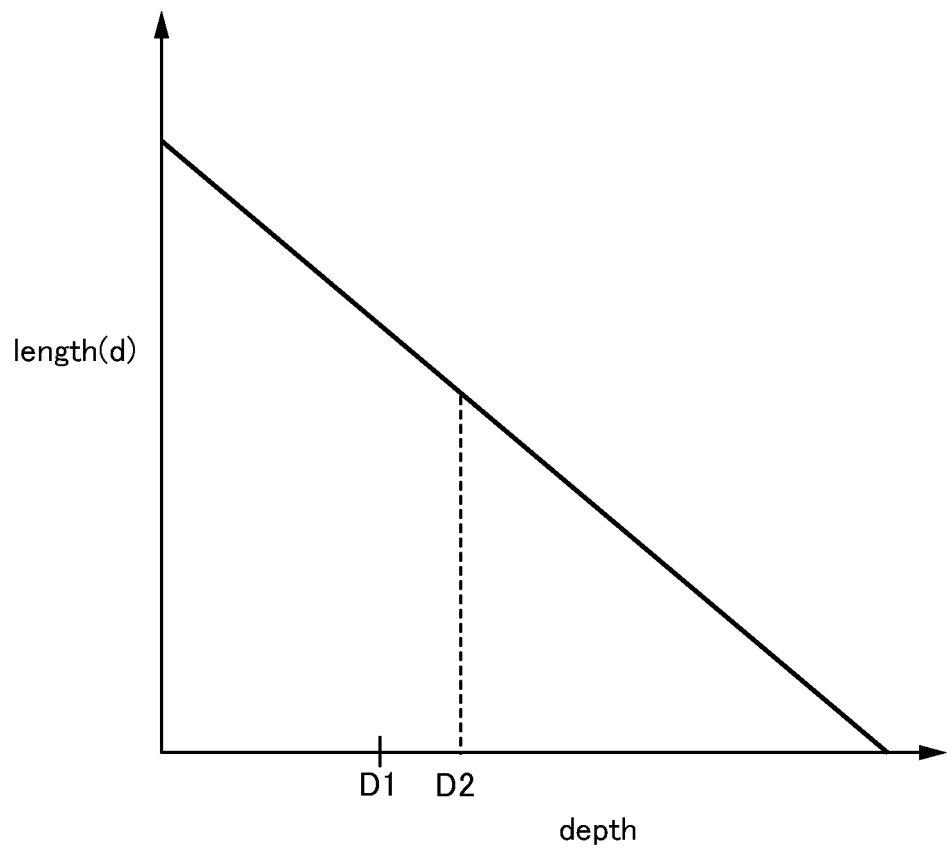
FIG. 8 is a graph showing an example of a perspective property profile according to the embodiment of the present invention.

FIG. 8 is an example of a perspective property profile according to the embodiment of the present invention. The perspective property profile shown in FIG. 8 is a function representing the relationship between the length of each side of a grid (unit length), which serves as a basis for perspective in the virtual space, and the depth from the virtual camera.

The horizontal axis in FIG. 8 represents the depth, and indicates a deeper position, i.e., a position farther from the virtual camera, as the value becomes greater. The vertical axis in FIG. 8 represents the length (length(d)) with which the unit length is displayed on the display unit 23 at a given depth, and indicates a longer displayed length, e.g., a greater number of pixels on the display unit 23, as the value becomes greater.

Now, the relationship between the user's movable range along the depth direction and the position where the GUI object is disposed will be described by using FIG. 8. D1 signifies the position farthest from the virtual camera in the user's movable range determined by the user-environment determining unit 64, i.e., the depth limit position in the user's movable range, which is the limit point of reach of the virtual body of the user. D2 signifies the position of a depth at which the GUI object is displayed, which is a position set by the virtual-object control unit 65 and having a greater depth than D1.

By changing the size of a virtual object in accordance with the depth position thereof by using the perspective property profile described above, it is possible to make the display size on the display unit 23 constant at any depth position. In one preferred example, when the length with which an arbitrary side constituting a virtual object is to be displayed on the display unit 23 at a given depth d is signified by length, the length vrscale of that side in the virtual space, needed for that purpose, is expressed by equation 1 below, where grid_length signifies the unit length.

$$vrscale = \frac{length * grid\_length}{length(d)} \quad \text{(Eq. 1)}$$

In this embodiment, the virtual-object control unit 65 determines the size of the GUI object in the virtual space by using the perspective property profile, for example, according to equation 1, so that the display size of the GUI object at the determined position will be constant on the display unit 23. For example, the display size of the GUI object on the display unit 23 is expressed in terms of the number of pixels on the screen of the display unit 23, and the constant display size refers to a certain constant size that allows recognition by the user.

As a result, in the case where the GUI object exists in the visual field range of the virtual camera, the displayed-image generating unit 67 generates a virtual space image including the GUI object having the constant display size. With this configuration, in this embodiment, it becomes possible to display the GUI object having the constant size on the display unit 23, while disposing the GUI object at a position not within the reach of the user's hands. This makes it possible to display a GUI object having high visibility and not interfering with the virtual body of the user. Note that the virtual-object control unit 65 can also determine the position of the GUI object so that the GUI object having the constant display size does not overlap any other virtual object in the visual field region of the virtual camera.

The perspective property profile need not be a function and may be data representing the corresponding relationships between a plurality of depth distances and display sizes of the unit length on the display unit 23 in the virtual space at the individual depth distances.

Next, information processing by the information processing system 1 according to the embodiment of the present invention will be described by using a flowchart shown in FIG. 9. The information processing shown in FIG. 9 is realized by causing the information processing device 10 to execute a program, by causing the HMD 20 to execute a program, or by causing the information processing device 10 to execute a program and also causing the HMD 20 to execute a program. Although it is assumed that the information processing device 10 mainly performs information processing in the following description, the HMD 20 may perform information processing in part or in entirety.

The information processing device 10 starts the information processing, for example, when the VR system provided by the information processing system 1 is activated. First, in step 901, the information processing device 10 determines the position of the user's viewpoint in the virtual space by determining the position of the user and the direction in which the user is facing from the position and inclination of the HMD 20 as determined by using sensors. The information processing device 10 disposes a virtual camera at the determined position of the user's viewpoint.

Then, in step 902, the information processing device 10 determines a user's movable range, which is a range in which the user is allowed to move in the virtual space, on the basis of the environment of the constructed virtual space and the position of the user's viewpoint.

Then, in step 903, the information processing device 10 determines a position where the GUI object is to be disposed at a predetermined position having a greater depth than the user's movable range, which falls in a virtual space region outside the user's movable range.

Then, in step 904, the information processing device 10 determines the size of the GUI object in the virtual space so that the display size of the GUI object at the disposed position on the display unit 23 will be constant from the determined position of the user's viewpoint. At this time, the information processing device 10 determines the size of the GUI object in the virtual space by using data representing the corresponding relationship between the depth and the display size of the unit length in the virtual space on the display unit 23, such as a perspective property profile.

Then, in step 905, the information processing device 10 generates rendering data of the virtual space including the GUI object having the determined size. Specifically, the information processing device 10 generates a virtual space image, as viewed from the virtual camera, to be displayed on the display unit 23 of the HMD 20. The information processing device 10 sends the generated virtual space image to the HMD 20, and the HMD 20 displays the virtual space image on the display unit 23. Alternatively, however, the information processing device 10 may generate data such as a rendering command for generating a virtual space image, as viewed from the virtual camera, to be displayed on the display unit 23 by the HMD 20.

Then, unless the VR system 1 provided by the information processing system is terminated (step 906), the position of the user's viewpoint and the visual field region of the virtual camera are updated in step 907 on the basis of the position and inclination of the HMD 20 as regularly determined at predetermined intervals by using sensors, and the processing returns to step 904. At this time, the information processing device 10 updates the position where the virtual camera is disposed to the position of the user's viewpoint. In step 904, the information processing device 10 determines the size of the GUI object in the virtual space so that the display size of the GUI object at the disposed position on the display unit 23 will be constant from the updated position of the user's viewpoint.

This information processing is information processing by the information processing device 10 in the case where the GUI object exists in the visual field region of the virtual camera. In one preferred example, the information processing device 10 determines whether or not the GUI object exists in the visual field region of the virtual camera before step 905 and executes step 905 only in the case where the GUI object exists therein. In another example, the information processing device 10 determines whether or not the GUI object exists in the visual field region of the virtual camera before step 904 and executes step 904 and step 905 only in the case where the GUI object exists therein.

Next, the operational advantages of the information processing system 1 according to the embodiment of the present invention will be described. In this embodiment, when the VR system is activated, the user-environment determining unit 64 determines the position of the user's viewpoint and the user's movable range on the basis of the position of the HMD 20 in the real space. After the user's movable range is thus determined in accordance with the environment, the virtual-object control unit 65 disposes a GUI object (GUI element) at a predetermined position having a greater depth than the movable range. Then, by using a perspective property profile, the virtual-object control unit 65 determines the size of the GUI object in the virtual space so that the display size of the GUI object at the determined position on the display unit 23 will be constant.

Furthermore, in this embodiment, the displayed-image generating unit 67 generates a virtual space image including a virtual body including the virtual penlights 71, the virtual hands 72, and the virtual arms 73 existing in the visual field region of the virtual camera.

With this configuration, in this embodiment, it becomes possible to let the user recognize the virtual body recognized by the user via the display unit 23 as if the hands and arms are those of the user himself or herself and the penlights are held by the user himself or herself. This makes it possible to let the user experience a sense of immersion, which is an attraction of VR.

Furthermore, with this configuration, in this embodiment, it becomes possible to display a GUI object having a constant size on the display unit 23, while disposing the GUI object at a position not within the reach of the user's hands. This makes it possible to display a GUI object having high visibility and not interfering with the virtual body of the user. Furthermore, with this configuration, in this embodiment, compared with the configuration where a GUI object is displayed on the display unit 23 of the HMD 20 as being completely separated from the VR space, it becomes possible to provide high visibility under a wide variety of situations, while providing the user with a sense of immersion.

Furthermore, the information processing system 1, the information processing method, a program for executing the method, etc. according to the embodiment configured as described above can be generally used for VR applications, such as a VR game in which a UI element that is independent from the background constituting the VR space, such as a window, is displayed.

Furthermore, in this embodiment, the virtual-object control unit 65 can determine the position of the GUI object so that the GUI object having a constant display size as viewed from the position of the user's viewpoint does not overlap any other virtual object. This makes it possible to display a GUI object having high visibility.

A program according to an embodiment of the present invention realizes the operation of the information processing system 1 by causing the processor 11 or the processor 21 to execute the program. Thus, the operational advantage of the program is the same as that of the information processing system 1.

The present invention, in another embodiment thereof, may also be a computer-readable storage medium storing a program for realizing the functions or information processing shown in the flowchart of the above-described embodiment of the present invention. The present invention, in yet another embodiment thereof, may also be a server that can provide a computer with a program for realizing the functions or information processing shown in the flowchart of the above-described embodiment of the present invention. The present invention, in yet another embodiment thereof, may also be a virtual machine that realizes the functions or information processing shown in the flowchart of the above-described embodiment of the present invention.

In the processing or operation described above, the processing or operation may be modified freely as long as no inconsistency arises in the processing or operation, such as an inconsistency wherein data that could not be available in one step is used in that step. Furthermore, the examples described above are examples for explaining the present invention, and the present invention is not limited to the examples. The present invention can be embodied in various forms not departing from the gist thereof. For example, the external shapes of the individual devices are not limited to those shown.

REFERENCE SIGNS LIST

1 Information processing system
10 Information processing device
11 Processor
12 Storage device
13 Input/output IF
14 Communication IF
20 Head-mounted display device
21 Processor
22 Storage device
23 Display unit
24 LED lights
25 Communication IF
30 Controller
31 Holding section
32 Operation buttons
33 LED light
61 Position determination unit
62 Storage unit
63 Processing unit
64 User-environment determining unit
65 Virtual-object control unit
66 User-operation processing unit
67 Displayed-image generating unit
71 Virtual arms
72 Virtual hands
73 Virtual penlights

The invention claimed is:

1. A non-transitory computer readable medium storing a program executed by a processing device that performs rendering processing of a virtual space including virtual objects to be displayed on a display unit of a head-mounted display device, the virtual objects including a predetermined GUI object, the program causing the processing device to execute:
 a step of determining the position of a viewpoint of a user in the virtual space on the basis of a position of the head-mounted display device in a real space, the position being obtained by using a sensor;
 a step of determining a movable range of the user in the virtual space;
 a step of determining a position of the GUI object in a region of the virtual space outside the determined movable range;
 a step of determining, by using corresponding relationships between depth and display sizes of a unit length in the virtual space on the display unit, a size of the GUI object in the virtual space such that the GUI object at the determined position has a constant display size on the display unit; and
 a step of generating rendering data of the virtual space including the virtual objects including the GUI object having the determined size.

2. The non-transitory computer readable medium according to claim 1, wherein the processing device is included in the head-mounted display device.

3. The non-transitory computer readable medium according to claim 1, wherein the processing device is included in an information processing device connected to the head-mounted display device so as to be able to communicate therewith.

4. The non-transitory computer readable medium according to claim 1,
 wherein the rendering processing includes rendering processing for rendering the virtual object corresponding to the position of a controller held by the user in the real space on the basis of the position of the controller, and
 wherein the movable range of the user includes a movable range of the virtual object corresponding to the position of the controller.

5. The non-transitory computer readable medium according to claim 1, wherein, in the step of determining the position of the GUI object, the position of the GUI object is determined such that the GUI object having the constant display size as viewed from the position of the viewpoint of the user does not overlap the other virtual objects.

6. The non-transitory computer readable medium according to claim 1, wherein the GUI object includes at least one of a selection window, a timed window, a progress bar, and a scroll bar.

7. An information processing method for performing rendering processing of a virtual space including virtual objects to be displayed on a display unit of a head-mounted display device, the virtual objects including a predetermined GUI object, the method comprising:
 a step of determining the position of a viewpoint of a user in the virtual space on the basis of a position of the head-mounted display device in a real space, the position being obtained by using a sensor;
 a step of determining a movable range of the user in the virtual space;
 a step of determining a position of the GUI object in a region of the virtual space outside the determined movable range;
 a step of determining, by using corresponding relationships between depths and display sizes of a unit length in the virtual space on the display unit, a size of the GUI object in the virtual space such that the GUI object at the determined position has a constant display size on the display unit; and
 a step of rendering, on the display unit, the virtual space including the virtual objects including the GUI object having the determined size.

8. An information processing system including a head-mounted display device including a display unit for displaying a virtual space to a user, the information processing system comprising:
- a sensor that obtains a position of the head-mounted display device in a real space;
- a processing unit that performs rendering processing of the virtual space including virtual objects to be displayed on the display unit, the virtual objects including a predetermined GUI object;
- a storage unit that stores data representing corresponding relationships between depths and display sizes of unit length in the virtual space on the display unit,
- wherein the processing unit:
- determines the position of a viewpoint of the user in the virtual space on the basis of the position obtained by the sensor;
- determines a movable range of the user in the virtual space;
- determines a position of the GUI object in a region of the virtual space outside the determined movable range;
- determines, by using the data stored by the storage unit, a size of the GUI object in the virtual space such that the GUI object at the determined position has a constant display size on the display unit; and
- renders, on the display unit, the virtual space including the virtual objects including the GUI object having the determined size.

9. An information processing system according to claim 8,
- wherein the information processing system includes a controller held by the user,
- wherein the rendering processing includes rendering processing for rendering the virtual object corresponding to the position of the controller on the basis of the position of the controller in a real space, and
- wherein the movable range of the user includes a movable range of the virtual object corresponding to the position of the controller.

10. An information processing system according to claim 8, wherein the data stored by the storage unit is prepared in advance by measuring, for each depth, a display size of the unit length in the virtual space displayed on the display unit.

11. An information processing system according to claim 8,
- wherein the information processing system includes an information processing device connected to the head-mounted display device so as to be able to communicate therewith, and
- wherein the processing unit is realized by the head-mounted display device and the information processing device.

12. A head-mounted display device including a display unit for displaying a virtual space to a user, the head-mounted display device comprising:
- a processing unit that performs rendering processing of the virtual space including virtual objects to be displayed on the display unit, the virtual objects including a predetermined GUI object; and
- a storage unit that stores data representing corresponding relationships between depths and display sizes of a unit length in the virtual space on the display unit,
- wherein the processing unit:
- determines the position of a viewpoint of the user in the virtual space on the basis of a position of the head-mounted display device in a real space, the position being obtained by using a sensor;
- determines a movable range of the user in the virtual space;
- determines a position of the GUI object in a region of the virtual space outside the determined movable range;
- determines, by using the data stored by the storage unit, a size of the GUI object in the virtual space such that the GUI object at the determined position has a constant display size on the display unit; and
- renders, on the display unit, the virtual space including the virtual objects including the GUI object having the determined size.

13. An information processing device for performing rendering processing of a virtual space including virtual objects to be displayed on a display unit of a head-mounted display device, the virtual objects including a predetermined GUI object, the information processing device comprising:
- a processing unit that performs rendering processing of the virtual space to be displayed on the display unit; and
- a storage unit that stores data representing corresponding relationships between depths and display sizes of a unit length in the virtual space on the display unit,
- wherein the processing unit:
- determines the position of a viewpoint of the user in the virtual space on the basis of a position of the head-mounted display device in a real space, the position being obtained by using a sensor;
- determines a movable range of the user in the virtual space;
- determines a position of the GUI object in a region of the virtual space outside the determined movable range;
- determines, by using the data stored by the storage unit, a size of the GUI object in the virtual space such that the GUI object at the determined position has a constant display size on the display unit; and
- sends, to the head-mounted display device, data for rendering, on the display unit, the virtual space including the virtual objects including the GUI object having the determined size.

* * * * *